United States Patent
McKinnon et al.

(10) Patent No.: US 10,461,299 B1
(45) Date of Patent: Oct. 29, 2019

(54) BATTERY PACK DESIGN FOR HIGH TEMPERATURE AND SHOCK AND VIBRATION APPLICATIONS

(71) Applicant: Electrochem Solutions, Inc., Clarence, NY (US)

(72) Inventors: Ernest M. McKinnon, Jamaica Plain, MA (US); John Hession, Braintree, MA (US); Renato Avelar, Berkley, MA (US); Bertrand Nelvy, Brockton, MA (US)

(73) Assignee: Electrochem Solutions, Inc., Clarence, NY (US)

( * ) Notice: Subject to any disclaimer, the term of this patent is extended or adjusted under 35 U.S.C. 154(b) by 825 days.

(21) Appl. No.: 14/058,683

(22) Filed: Oct. 21, 2013

Related U.S. Application Data

(60) Provisional application No. 61/716,544, filed on Oct. 21, 2012.

(51) Int. Cl.
*H01M 2/02* (2006.01)
*H01M 2/20* (2006.01)

(52) U.S. Cl.
CPC .................................. *H01M 2/202* (2013.01)

(58) Field of Classification Search
CPC .................................................. H01M 2/202
See application file for complete search history.

(56) References Cited

U.S. PATENT DOCUMENTS

| | | | | |
|---|---|---|---|---|
| 1,999,273 A | * | 4/1935 | Austin | H01B 5/104 174/127 |
| 3,644,145 A | * | 2/1972 | Fraioli | H01M 4/66 429/102 |
| 3,770,511 A | * | 11/1973 | Winterbottom | H01M 2/1011 429/121 |
| 4,675,259 A | | 6/1987 | Toffy | |
| 4,970,073 A | | 11/1990 | Arzur et al. | |
| 6,224,997 B1 | | 5/2001 | Papadopoulos | |
| 6,423,441 B1 | * | 7/2002 | Ronning | H01M 2/202 361/748 |
| 2007/0210760 A1 | * | 9/2007 | Shimamura | H01M 2/1077 320/135 |
| 2007/0252556 A1 | * | 11/2007 | West | H01M 2/202 320/116 |
| 2012/0225331 A1 | | 9/2012 | Tartaglia | |

* cited by examiner

*Primary Examiner* — Osei K Amponsah
(74) *Attorney, Agent, or Firm* — Michael F. Scalise; Steven W. Winn

(57) ABSTRACT

Various embodiments of an electrochemical cell interconnect assembly are described. The interconnect assembly is designed to be positioned between two adjacent electrochemical cells, providing an electrical conduit therebetween. The interconnect assembly consists of an interconnect body having a curved formed and an interwoven wire structure. The interconnect assembly is designed to provide a robust electrical connection between two adjacent electrochemical cells in extreme mechanical stress and temperature environments.

19 Claims, 11 Drawing Sheets

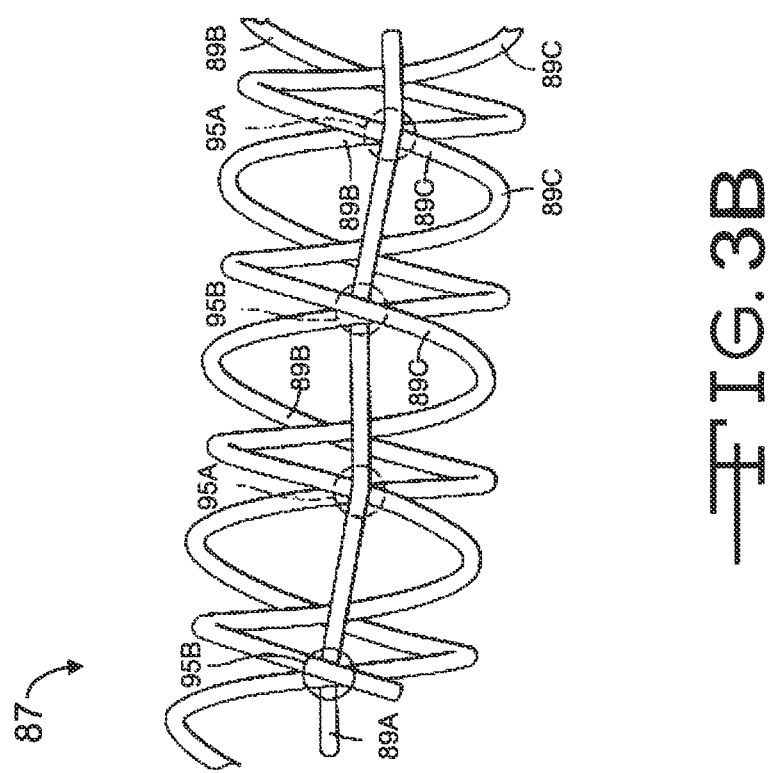

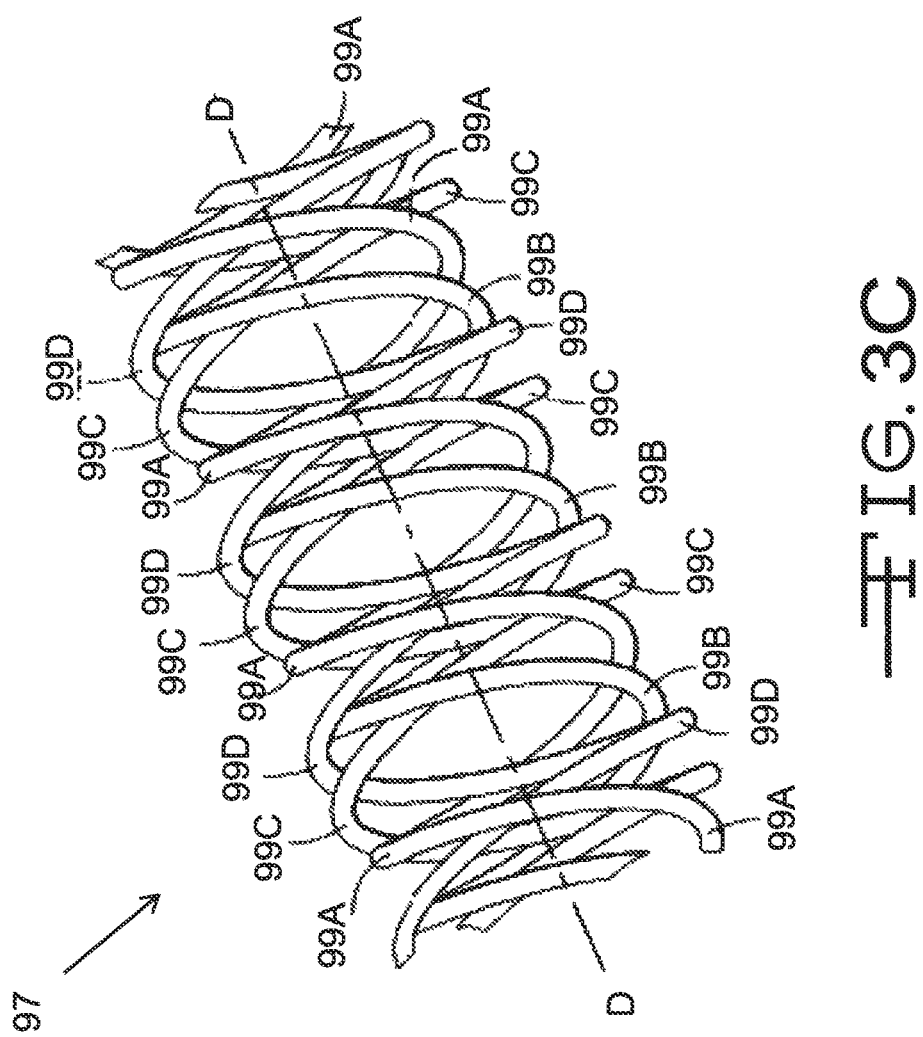

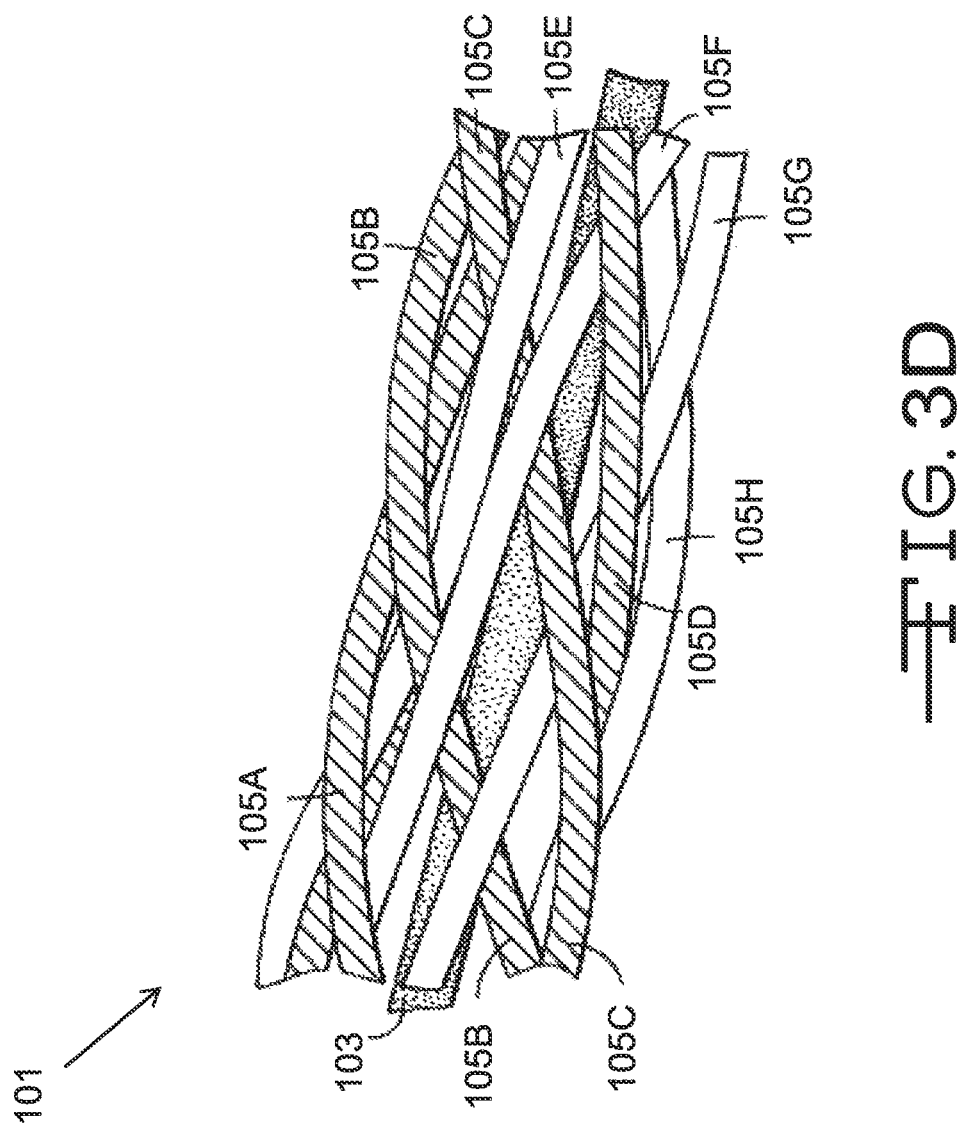

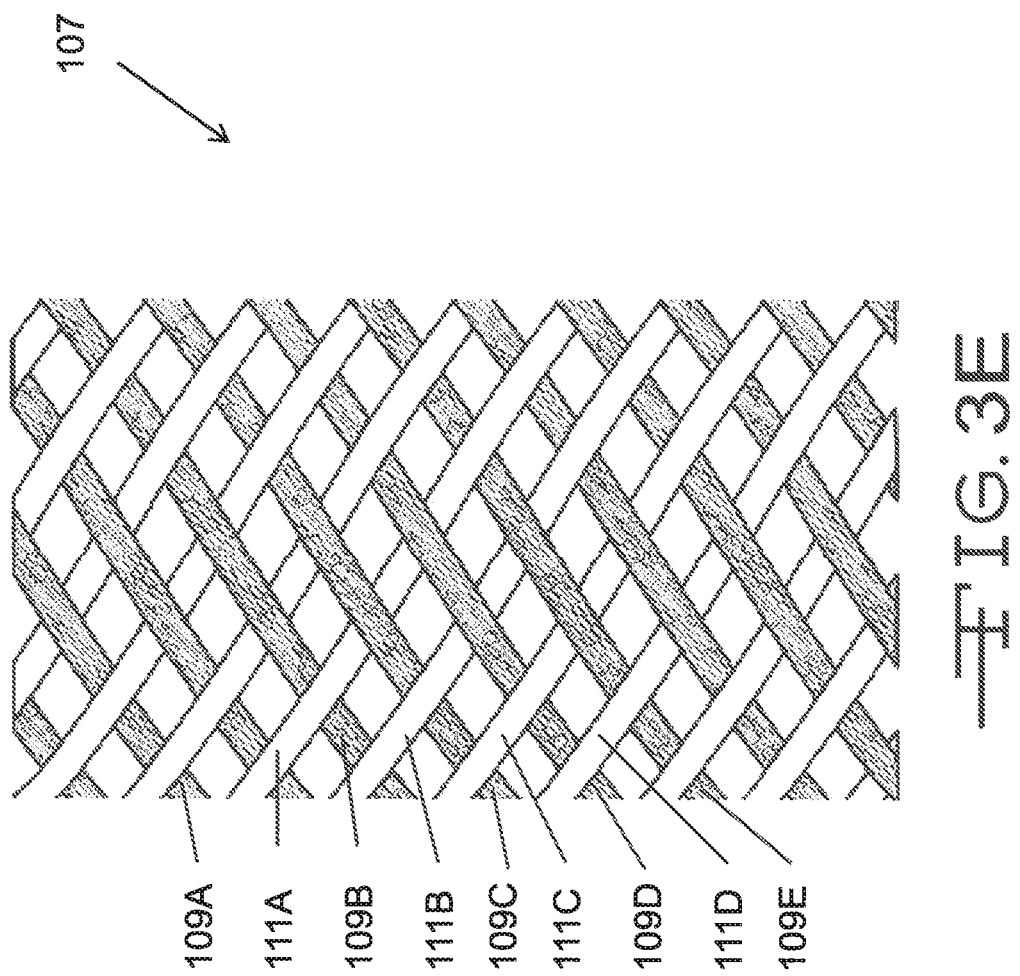

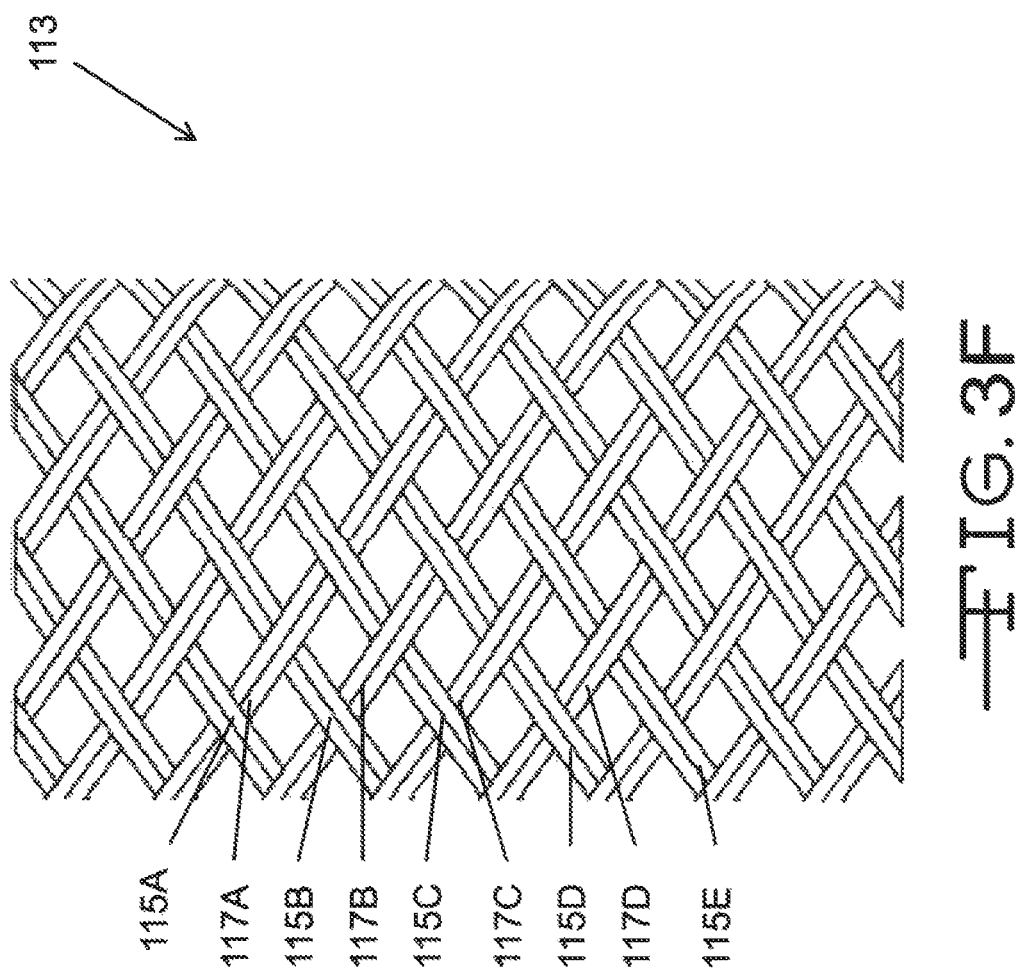

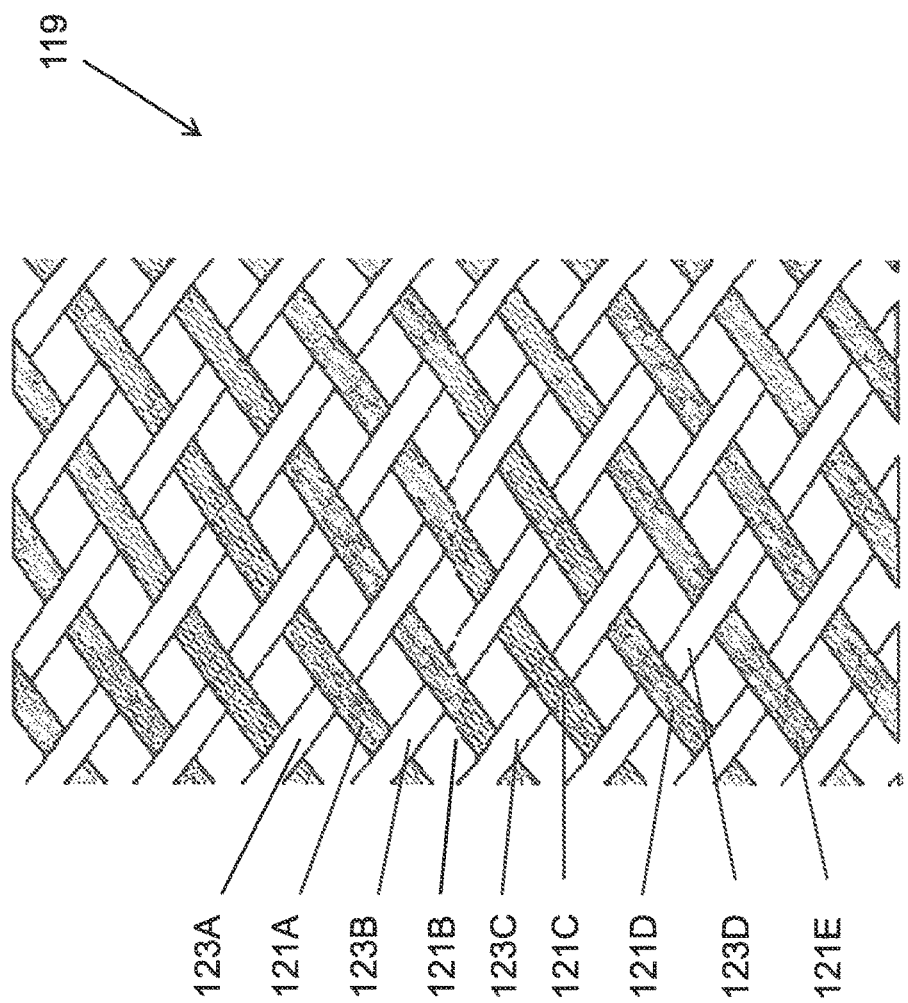

BATTERY PACK DESIGN FOR HIGH TEMPERATURE AND SHOCK AND VIBRATION APPLICATIONS

CROSS-REFERENCE TO RELATED APPLICATION

This application claims priority from U.S. Provisional Application Ser. No. 61/716,544, filed Oct. 21, 2012.

TECHNICAL FIELD

The present invention relates generally to electrochemical cells, and more particularly to embodiments of interconnect assemblies used to electrically connect electrochemical cells and modular batteries commonly used to provide power to electronic devices.

BACKGROUND OF THE INVENTION

Many electronic devices, such as sensors, are designed to operate in harsh environmental conditions. In many cases, these electronic devices are used to provide information, guidance and feedback that is critically important to its operator. Such devices are often subjected to harsh environments such as elevated temperatures, sub-freezing temperatures, thermal shock, and/or corrosive atmospheres. In addition, these devices may also be subjected to excessive mechanical stresses, such as mechanical shock and vibration.

Among these electronic devices are the instruments and tools typically used in oil and gas drilling operations. One such device, referred to as a "measurement while drilling" (MWD) instrument, is used in oil and gas exploration. These MWD devices are often positioned within the structure of the drill and are used to help an operator guide the drill to regions of oil and gas deep within the earth. These devices generally provide information regarding temperature, depth, position, and pressure at and around the drill head. As such, these devices are often subjected to temperatures in excess of 150° C. and, as the drill bores through the earth, mechanical vibrations in excess of 0.50 $G^2$/Hz power spectral density (PSD).

Electrochemical cells or modular battery packs are often used to electrically power these devices. In many cases, electrochemical cells or modular battery packs are positioned within the device. Therefore, these electrochemical cells and modular battery packs are also often subjected to the same environmental conditions, that is, the thermal and mechanical stresses, as the devices they power. Hence, these electrochemical cells are typically designed to withstand these harsh conditions.

One of the important design considerations of a modular battery pack is the interconnect that electrically connects two adjacently positioned electrochemical cells together therewithin. The interconnect is a critical component that provides a conduit for electrical energy to pass therethrough. In general, the interconnect is positioned external to the electrochemical cell or even a modular battery pack when electrically connecting two or more packs together. Therefore, the interconnect has an increased exposure to thermal and mechanical stresses that makes it prone to possible breakage or becoming disconnected from the electrochemical cell. If the interconnect were to become damaged or disconnected, electrical power to the device being powered could be compromised. This, therefore, could be particularly problematic if the device is in a remote location and/or at a significant distance away from the operator.

Typical modular battery packs of the prior art have relied on a metallic tab, generally made of nickel or stainless steel, to electrically connect adjacent electrochemical cells. The prior art tabs generally comprise multiple folds in which the tab is folded over itself in an "accordion-like" fashion. These folds are intended to provide some mechanical resilience as the adjacent cells are spaced apart from each other. However, finite element analysis (FEA) modeling has indicated that under extreme mechanical vibration and temperature conditions, these prior art tabs may be susceptible to breakage. For example, under computer modeling conditions of 20 root mean square acceleration (Grms) random vibration from 5 to 500 Hz at temperatures ranging from 75° C. to 210° C. for four hours, the prior art tabs are prone to shear and break along the folds.

Therefore, there exists a need to provide an interconnect with a robust design that is capable of withstanding the increased thermal and mechanical stresses associated with powering devices in harsh environments, particularly MWD devices. The present invention fulfills this need by providing various embodiments of an electrochemical cell interconnect assembly that is designed to withstand temperatures in excess of 150° C. and mechanical vibration greater than 0.50 $G^2$/Hz PSD.

SUMMARY OF THE INVENTION

The present invention provides various embodiments of an interconnect assembly used to electrically connect two or more adjacent electrochemical cells or modular battery packs. The interconnect assembly is designed to minimize the potential of breaking or becoming disconnected from a cell, particularly when subjected to harsh environments such as extreme hot or cold temperatures, mechanical shock and vibration.

In an embodiment, the present invention comprises an interconnect assembly comprising an interconnect body that is attached to contact plates positioned at opposing ends of the body. The contact plates are preferably electrically connectable to respective positive and negative ends of two electrochemical cells or modular battery packs, thus the interconnect provides an electrical conduit between the two cells. In addition, an epoxy resin may be used to encapsulate and further secure the ends of the interconnect body to the respective cells.

In a preferred embodiment, the interconnect body of the present invention is constructed having a curved form. More specifically, the interconnect body is of a uniform construction having a "C" or "S" shaped structure. In addition, the interconnect body of the present invention is preferably constructed of interwoven or braided strands of metal. The preferred curved form of the interconnect body provides added flexibility that enables the interconnect body to move with the mechanical shock and vibration, thus, minimizing the potential of breakage. In addition, the interwoven strands that comprise the interconnect body further increase the flexibility and mechanical robustness of the interconnect body structure. Similar to that of a spring, the curved form and braided wire structure of the interconnect body provide a bias force that counteracts mechanical stresses that may be applied to the body. In addition to the increased flexibility, the braided wire structure increases the structural robustness of the body thus minimizing the effects of exposure to extreme temperatures and thermal shock.

Finite element analysis was used to compare the structural integrity of the interconnect body of the present invention having an interwoven strand and curved form construction to that of the folded interconnect tab structures of the prior art. Results of the analysis indicated that a significant reduction in mechanical stress concentration was achieved with the interconnect assembly of the present invention, particularly when subjected to mechanical vibration at elevated temperatures. Specifically, the analysis indicated that a reduction in mechanical stress concentration of more than 50% can be achieved utilizing the interconnect body of the present invention.

The curved shape and interwoven strand structure of the interconnect body of the present invention provides a flexible and robust interconnect assembly that is capable of withstanding the added mechanical and thermal stresses of harsh environments, particularly during oil and gas exploration operations. While the interconnect assembly of the present invention is primarily designed to be incorporated within a modular battery pack used to power devices used in the oil and gas industry, use of the interconnect assembly of the present invention is non-limiting and can also be used in battery packs that power devices for a variety of other applications. Examples of these devices may include portable medical devices, such as external defibrillators, medical drills and saws. In addition, the interconnect assembly may be incorporated within modular battery packs used to power non-medical devices like communication devices, such as radios, and analytical equipment such as sensors.

BRIEF DESCRIPTION OF THE DRAWINGS

FIGS. 3B through 3D illustrate alternate embodiments of cables having interwoven structures that may be utilized in the interconnect assembly of the present invention.

FIGS. 3E through 3G show alternate embodiments of interwoven braided constructions of a sidewall of the interconnect bodies shown in FIGS. 2 and 2A.

DETAILED DESCRIPTION OF THE PREFERRED EMBODIMENTS

Figure 1:
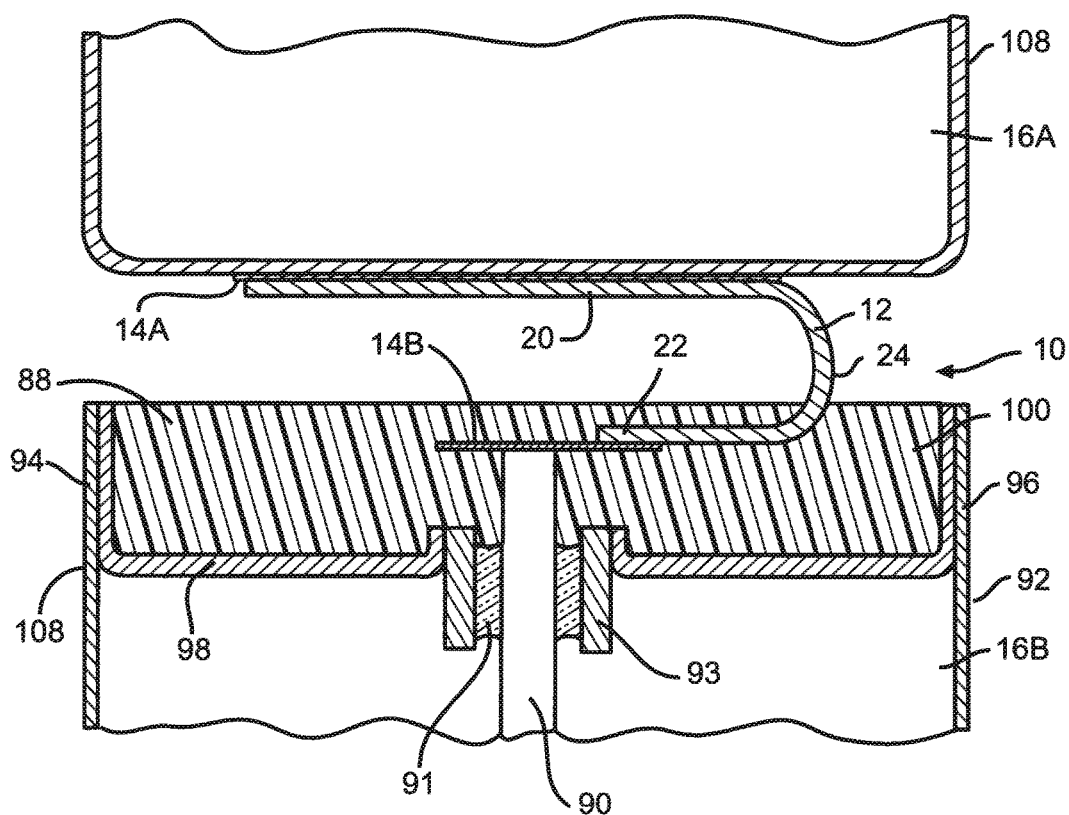
FIG. 1 is a cross-sectional view of an embodiment of an interconnect assembly of the present invention positioned between two electrochemical cells.
Figure 4:
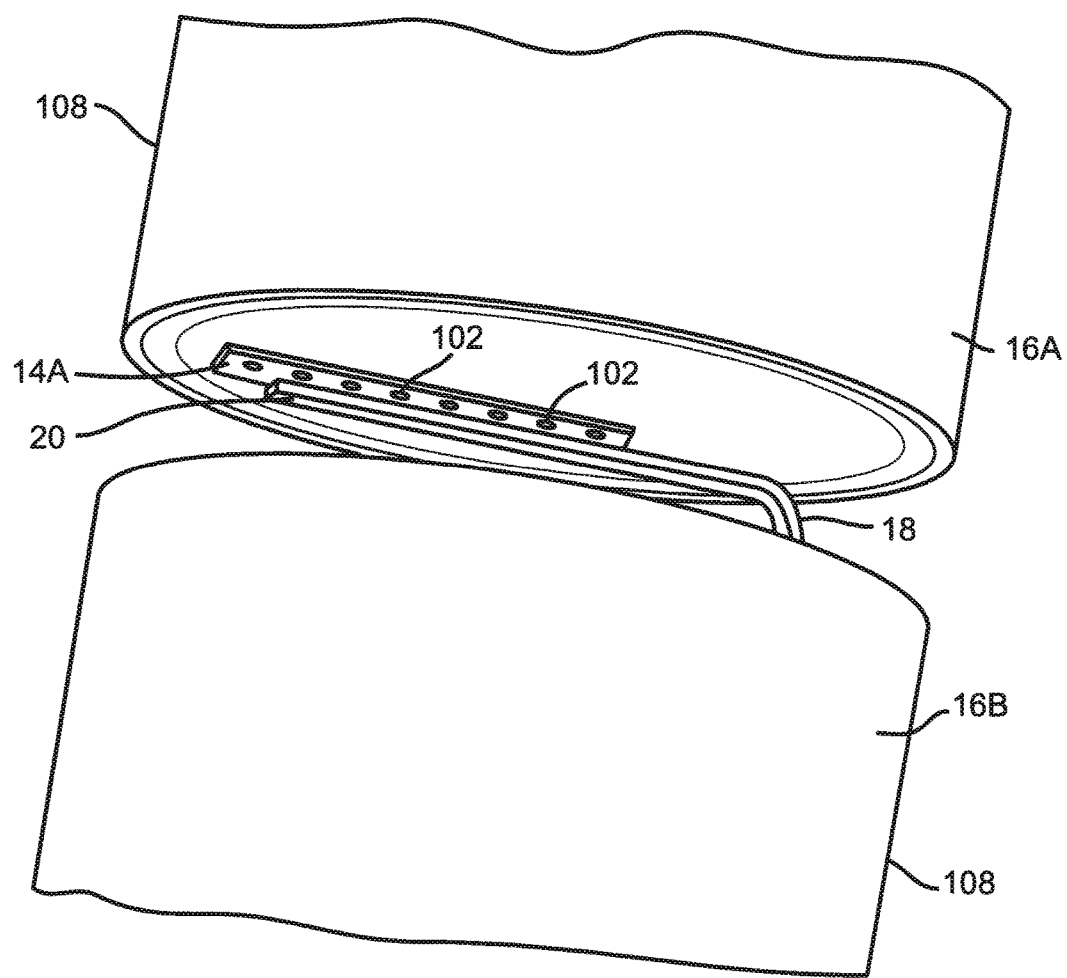
FIG. 4 shows a perspective view of an embodiment of a distal portion of an interconnect body attached to a contact plate that is welded to an end of an electrochemical cell.
Figure 5:
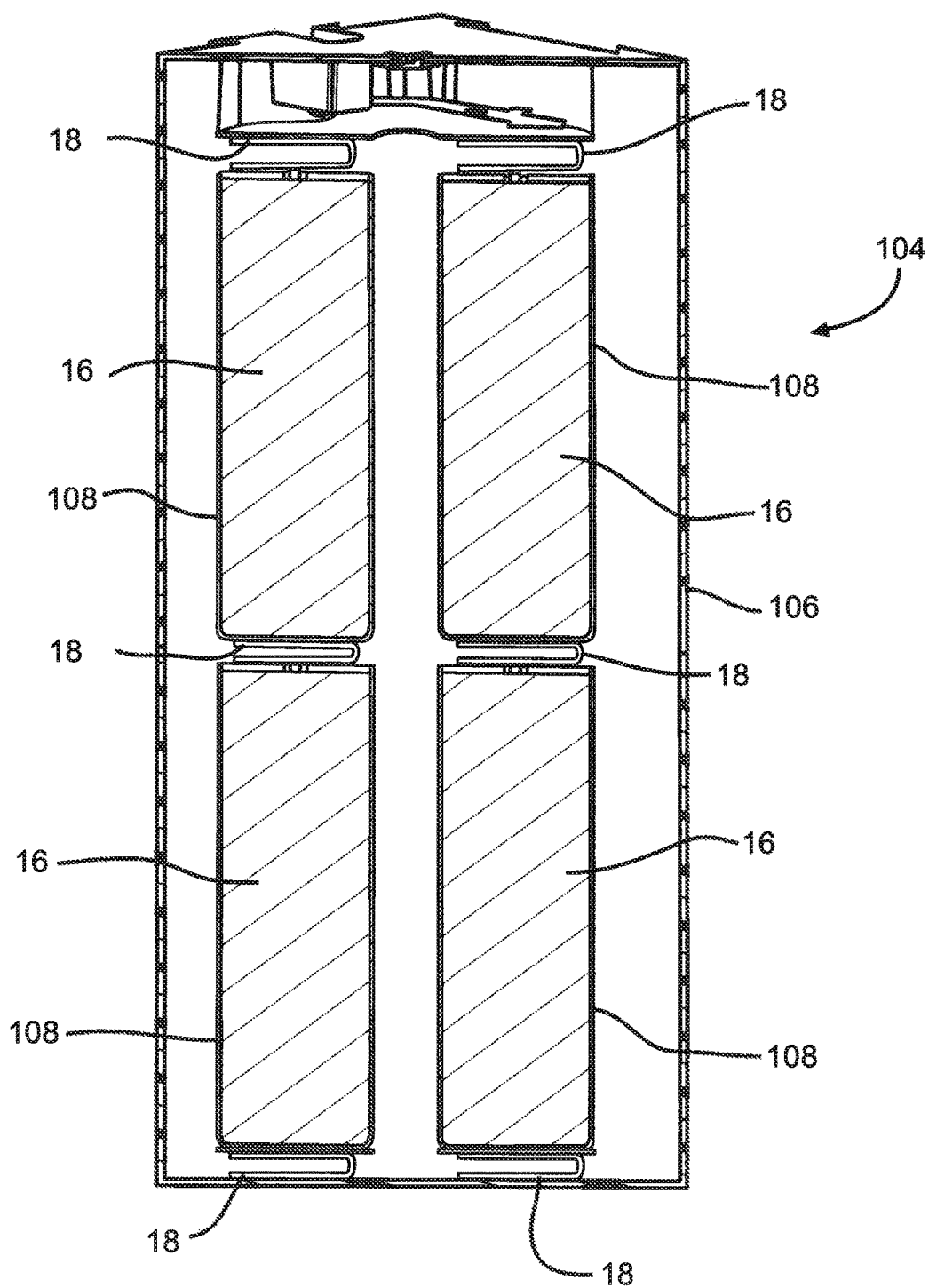
FIG. 5 illustrates an embodiment of a modular battery pack incorporating the interconnect assembly of the present invention.

Turning now to the drawings, FIGS. 1, 4 and 5 illustrate various embodiments of an electrochemical cell interconnect assembly 10, according to the present invention. The interconnect assembly 10 of the present invention provides an electrical conduit between adjacent electrochemical cells.

As shown in FIG. 1, the interconnect assembly 10 comprises an interconnect body 12 and at least two contact plates, a first contact plate 14A and a second contact plate 14B, positioned at the respective ends of the interconnect body 12.

In a preferred embodiment, as shown in FIGS. 1, 4 and 5, the interconnect body 12 is preferably positioned between two adjacent electrochemical cells. More specifically, the respective ends of the interconnect body 12 are electrically connectable to the contact plates 14A, 14B. Each contact plate 14A, 14B is preferably connectable to respective first and second terminals or positive and negative terminals of two spaced apart electrochemical cells 16, i.e., a first electrochemical cell 16A and a second electrochemical cell 16B, as illustrated in FIGS. 1 and 4.

Figure 2:
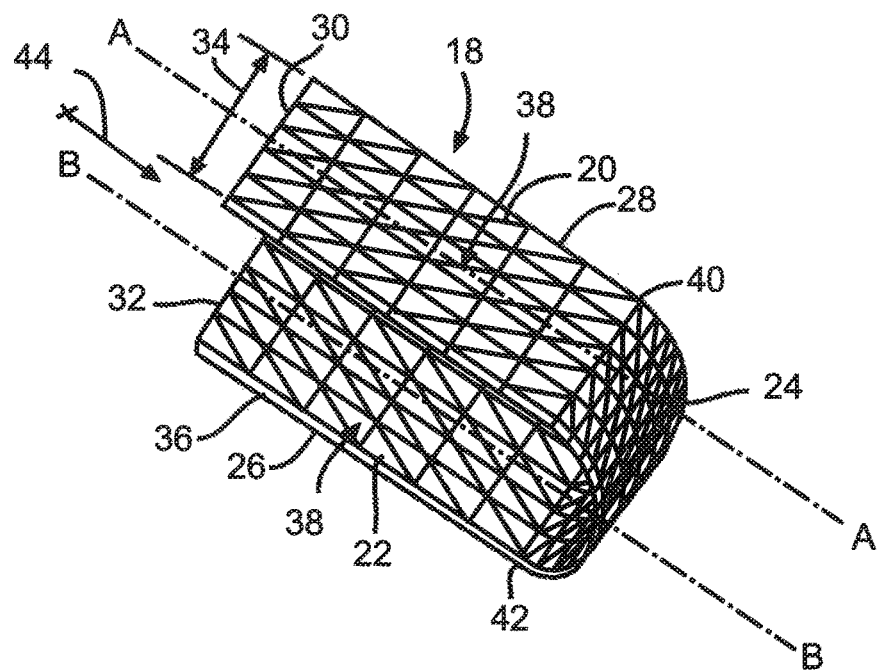
FIG. 2 illustrates a perspective view of an embodiment of an interconnect body of the present invention shown in FIG. 1.
Figure 2A:
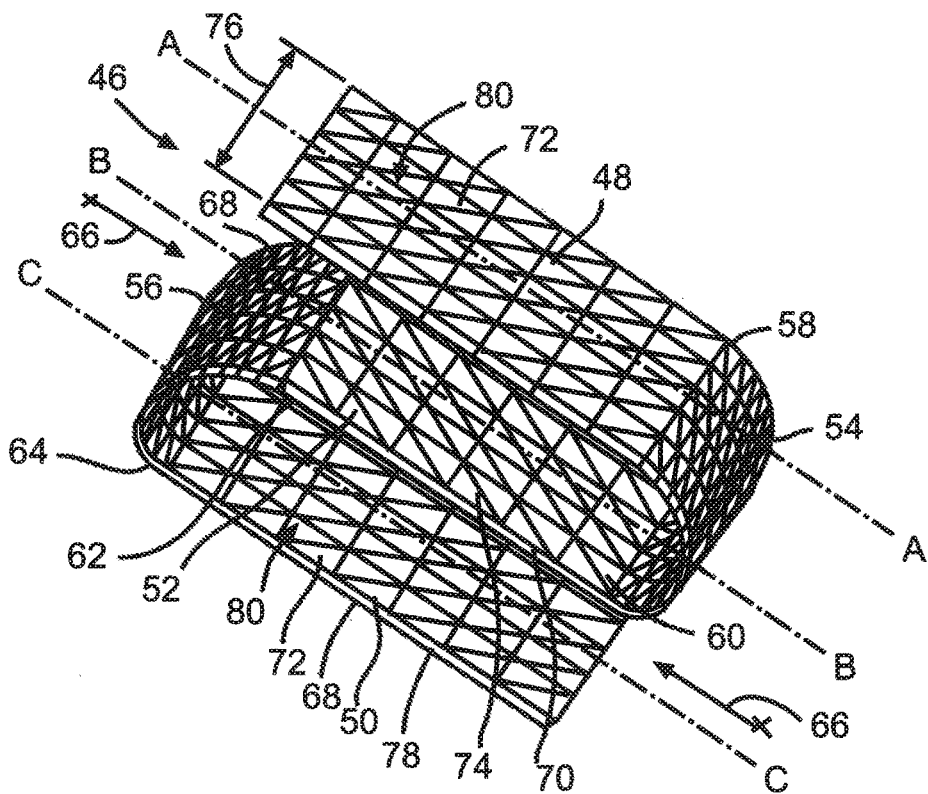
FIG. 2A shows a perspective view of an alternative embodiment of an interconnect body.

FIGS. 2 and 2A illustrate embodiments of the interconnect body of the present invention. FIG. 2 illustrates an embodiment of an interconnect body 18 of the present invention. As shown, the interconnect body 18 is of a uniform construction having a sidewall that extends from a distal portion 20 to a proximal portion 22. A curved portion 24 resides therebetween. More specifically, the interconnect body 18 comprises a left sidewall 26 spaced from a right sidewall 28. The left and right sidewalls 26, 28 extend and meet respective top and bottom sidewalls 30, 32. The top and bottom sidewalls 30, 32 respectively extend widthwise to form a body width 34, which preferably ranges from about 0.1 cm to about 2 cm. In addition, the left and right sidewalls 26, 28, respectively extend lengthwise to form a sidewall depth 36 that ranges from about 0.05 cm to about 1 cm.

In a preferred embodiment, the interconnect body 18 of the present invention, comprises a uniform body width 34 and sidewall depth 36 that extends from the distal portion 20 to the proximal portion 22. However, it is contemplated that the body width 34 and/or the sidewall depth 36 may be non-uniform from the distal portion 20 to the proximal portion 22. In another embodiment, the sidewall of the interconnect body 18, preferably comprises a rectangular cross-section perpendicular to its length. However, it is contemplated that the cross-sectional shape is not limiting and may comprise a curved, circular, triangular or other polygon shape perpendicular to its length. Furthermore, the top and bottom sidewalls 30, 32 of the distal and proximal portions 20, 22 preferably comprise an exterior surface 38 that is planar. However, it is further contemplated that the external surface 38 of the distal and/or proximal portions 20, 22 of the interconnect body 18 may be non-planar, such as curved.

In a preferred embodiment, the interconnect body 18 is constructed having a curved form. As illustrated, the embodiment of the interconnect body 18 shown in FIG. 2, is constructed in a form similar to that of the letter "C". More specifically, the respective distal and proximal portions 20, 22 are positioned such they are about parallel to each other. As illustrated in FIG. 2, a length of the distal portion 20 preferably extends along imaginary longitudinal axis A-A and a length of the proximal portion 22 extends along imaginary longitudinal axis B-B. In a preferred embodiment, longitudinal axes A-A and B-B extend parallel to each other and are positioned a distance away from each other. The curved portion 24 is curved such that its opposing first and second ends 40, 42, seamlessly join the respective distal and proximal portions 20, 22 of the interconnect body 18. In a preferred embodiment, the curved portion 24 comprises a radius of curvature 44 that ranges from about 1 cm to about 10 cm.

FIG. 2A illustrates an alternative embodiment of an interconnect body 46 of the present invention. As shown, the interconnect 46 is constructed in a form similar to that of the letter "S". Like the previous embodiment of the interconnect body 18, the interconnect body 46 illustrated in FIG. 2A, comprises a uniform structure having a sidewall that extends from a distal portion 48 to a proximal portion 50. However, unlike the previous embodiment of the interconnect body 18 illustrated in FIG. 2, the interconnect body 46 comprises an intermediate portion 52 and first and second curved portions 54, 56 that reside therebetween. More specifically, as illustrated in FIG. 2A, the distal portion 48 extends and meets the first curved portion 54. The first curved portion 54 extends and meets the intermediate portion 52 which extends and meets the second curved portion 56. The second curved portion 56 extends and meets the proximal portion 50.

As illustrated in FIG. 2A, the respective distal, proximal, and intermediate portions 48, 50, and 52 of interconnect body 46 are preferably positioned such they are about parallel to each other. As shown, a length of the distal portion 48 preferably extends along imaginary longitudinal axis A-A, a length of the intermediate portion 52 extends along imaginary longitudinal axis B-B and a length of the proximal portion 50 extends along imaginary longitudinal axis C-C. Longitudinal axes A-A, B-B and C-C preferably extend parallel to each other and are each positioned a distance away from each other.

The first curved portion 54 is curved such that the opposing distal and proximal ends 58, 60 of the first curved portion 54 seamlessly joins the respective distal and intermediate portions 48, 52 of the interconnect body 46. The second curved portion 56 is curved such that the opposing distal and proximal ends 62, 64 of the second curved portion 56 seamlessly join the respective intermediate and proximal portions 52, 50 of the interconnect body 46. In a preferred embodiment, the first and second curved portions 54, 56 comprise a radius of curvature 66 ranging from about 1 cm to about 10 cm.

In a preferred embodiment, as illustrated in FIG. 2A, the interconnect body 46 comprises a left sidewall 68 spaced from a right sidewall 70. The left and right sidewalls 68, 70 extend and meet respective top and bottom sidewalls 72, 74. The top and bottom sidewalls 72, 74 extend widthwise forming a body width 76, which preferably ranges from about 0.5 cm to about 2.0 cm. Furthermore, the distance between the top and bottom sidewalls 72, 74 extend lengthwise to form a sidewall depth 78, ranging from about 0.05 cm to about 1.0 cm. In a preferred embodiment, the body width 76 and sidewall depth 78 of the interconnect body 46 preferably comprise a uniform width and depth, respectively, that extend from the distal portion 48 to the proximal portion 50. However, it is contemplated that the body width 76 and/or the sidewall depth 78 may be non-uniform as they extend from the distal portion 48 to the proximal portion 50. In another embodiment, the sidewall of the interconnect body 46 preferably comprises a rectangular cross-section perpendicular to its length. However, it is contemplated that the cross-sectional shape is not limiting and may comprise a curved, circular, triangular or other polygon shape perpendicular to its length. In addition, the top and bottom sidewalls 72, 74 of the distal and proximal portions 48, 50 preferably comprise an exterior surface 80 that is planar. However, it is further contemplated that the external surface 80 of the distal and/or proximal portions 48, 50 of the interconnect body 46 may be curved.

Figure 3:
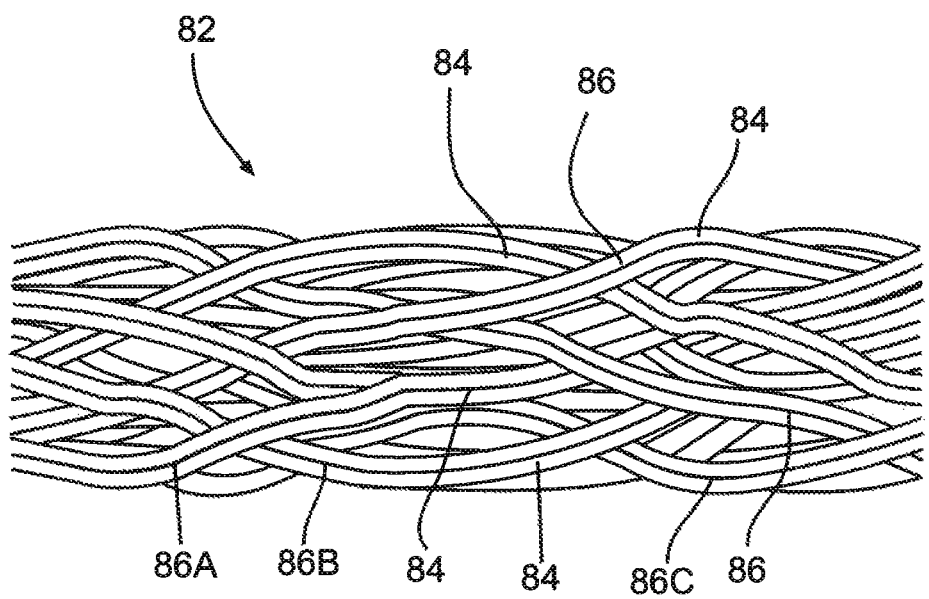
FIG. 3 illustrates a magnified plan view of an embodiment of a braided structure of a sidewall of the interconnect bodies shown in FIGS. 2 and 2A.
Figure 3A:
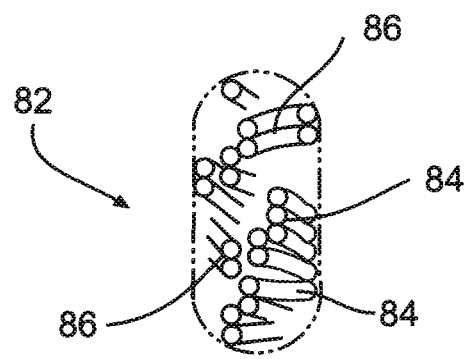
FIG. 3A is a cross-sectional view a sidewall of the interconnect body illustrating the interwoven braided construction.

In addition to the curved construction, the sidewalls of the interconnect bodies 18, 46 of the present invention further comprise an interwoven or braided strand construction 82. As illustrated in FIGS. 3 and 3A, a multitude of individual strands 84 of wire are interwoven in an overlapping braided form. In a preferred embodiment, the individual strands 84 of wire are joined together to form a cable 86, of which a plurality is interwoven together to form the braided strand construction 82.

As shown in FIGS. 3 and 3A, at least two wire strands 84 are positioned side by side to thereby form the cable 86. In a preferred embodiment, the cables 86 are further interwoven in an overlapping fashion to form a sidewall having the interwoven or braided construction 82. In a preferred embodiment, as shown in FIG. 3, a first cable 86A is positioned over a second cable 86B, which is then positioned under a third cable 86C. This pattern is then repeated until the desired length, width and thickness of the sidewall of the interconnect body 18, 46 is achieved. In a preferred embodiment, the braid is constructed having a picks per inch ranging from about 10 to 20. "Picks per inch" is defined herein as the number of times the cable crosses over the backs of other cables in the same direction and extending in the same longitudinal axis for each inch of length.

In a preferred embodiment, the strands 84 of wire comprise a metallic material. More preferably, the strands 84 of wire may be composed of stainless steel, copper, aluminum, MP35N, titanium and combinations thereof. Most preferably, the strands 84 of wire may be composed of a 300 series stainless steel including but not limited to 304, 316, 316L, and combinations thereof. In a preferred embodiment, each of the strands of wire should be fabricated to conform to specification MIL-W-423.

The curved form and braided wire construction 82 of the interconnect bodies 18, 46 provide flexibility that preferably absorbs the mechanical shock and vibration that a modular battery pack may be subjected. The respective "C" and "S" shaped construction of the respective interconnect bodies 18, 46 act similarly to that of a shock absorber such that the interconnect bodies 18, 46 are capable of dampening mechanical shocks and vibrations. Table 1, shown below, summaries the finite element analysis (FEA) results comparing the prior art tab structure to the preferred curved and braided construction 82 of the interconnect bodies 18, 46 of the present invention.

TABLE 1

| Sample ID | Peak Mean Stress (MPa) | Percent Stress Reduction Compared to Prior Art Tab 1 | Percent Stress Reduction Compared to Prior Art Tab 2 |
| --- | --- | --- | --- |
| Prior Art Tab 1 | 94 | N/A | N/A |
| Prior Art Tab 2 | 144 | N/A | N/A |
| Braided "S" Interconnect | 15 | 81.0% | 88.4% |
| Braided "C" Interconnect | 25 | 63.7% | 79.0% |

As Table 1 above illustrates, the finite element analysis indicates that the interconnect bodies 18, 46 of the present invention provide a significant reduction in peak mean stress in comparison to the prior art tab construction. In the analysis, the modeled samples were subjected to a simulated temperature increase of 140° C., from 25° C. to 165° C. and a mechanical vibration of 0.81 $G^2$/Hz PSD. The analysis showed that utilization of the interconnect bodies 18, 46, of the present invention, resulted in a reduction in peak mean stress of at least 63% in comparison the prior art tab interconnects.

Additional embodiments of various interwoven strand configurations that may be used to construct the sidewalls of the interconnect bodies 18, 46, are illustrated in FIGS. 3B-3G. FIG. 3B illustrates an alternate embodiment of a multi-strand cable 87 including a first strand 89A, a second strand 89B, and a third strand 89C. In the illustrated embodiment, the second strand 89B is under (inside of) the third strand 89C in front and over (outside of) the third strand 89C in back. The second and third strands 89B, 89C cross in front and in back, with the in-front crossings indicated by reference numerals 95A and 95B. As used herein, the term "strand" refers to the elongate members which may be braided (can be used to form a braid), and which may be a cable, a bundle, a twisted cable or bundle, a filar or group of filars, etc. First strand 89A is oriented substantially longitudinally with the longitudinal axis of the multi-strand cable 87, and passing alternatively under and over the crossing regions 95A and 95B. In this example, first strand 89A passes over crossing regions 95A and under cross regions 95B. In this way, a longitudinal or linear "wave" is imparted to the first strand 89A. This provides an increased flex life to the insulated conductor. First strand 89A may be referred to as a zero degree, warp or triaxial, or fiber.

In a variation of the embodiment of FIG. 3B, the second and third strands 89B, 89C are braided differently. In other embodiments, multiple strands may be included by modifying the braid pattern. In one such embodiment, another such zero degree strand is woven in and out of the braided strands.

FIG. 3C illustrates another multi-strand cable 97 having a longitudinal axis D-D, a first strand 99A, a second strand 99B, a third strand 99C, and a fourth strand 99D. The first strand 99A and the second strand 99B do not directly cross each other and each has a substantially coiled shape. This forms an essentially coiled structure within the braid which imparts increased flex life to the strands. In this embodiment, the braided third and fourth strands 99C, 99D maintain the overall configuration.

The multi-strand cable 97 represents a 2×2 diamond braid, where the first and second strands 99A, 99B are wound in a first direction (e.g. clockwise) and the third and fourth strands 99C, 99D are wound in a second, opposite direction (i.e. counter-clockwise). This 2×2 diamond braid, as well as 1×1, 3×3, 4×4, 8×8, etc diamond braids are explicitly within the scope of the invention. The first and second strands 99A, 99B run side by side, so they do not cross other conductors, but only the third and fourth strands 99C, 99D. In this way, the first and second strands 99A, 99B preferably do not rub up against each other. Since the braid maintains this configuration, not as much stress must be placed on the first and second 99A, 99B in order to maintain them in the desired shape.

FIG. 3D is an illustration of another embodiment of a multi-strand cable 101 according to the invention. The cable 101 may be formed around a mandrel 103 running along the central longitudinal axis thereof. The cable 101 includes a first strand 105A, a second strand 105B, a third strand 105C, and a fourth strand 105D. The strands 105A, 105B, 105C and 105D are each preferably formed of a multitude (e.g. seven) of twisted wires, each wire being formed of twisted filaments of a metallic construction. The cable 101 also includes a fifth strand 105E, a sixth strand 105F, a seventh strand 105G, and an eighth strand 105H.

Inspection of FIG. 3D shows that going from right to left, the fifth and sixth strands 105E and 105F are adjacent to each other. The strands 105E and 105F both cross over the first strand encountered (third strand 105C), then the fifth strand 105E crosses under the next conductor encountered (the second strand 105B) with the sixth strand 105F also crossing under the same strand 105B in the same region, then both the fifth and sixth strands 105E and 105F cross under the next conductor encountered, then (not visible in FIG. 3D) the fifth strand 105E and the sixth strand 105F both cross over the next strand.

Similarly, following a pair of adjacent strands 105B and 105C from right to left shows that the second strand 105B crosses over the fifth strand 105E while the third strand 105C crosses under, then both the second and third strands 105B and 105C cross under the next strand 105F, then the second strand 105B crosses under the next strand 105G while the third strand 105C crosses over. This pattern may be termed a herringbone, regular braid pattern, with each strand passes under two strands, then over two strands.

FIG. 3E illustrates a braid pattern 107 called a herringbone, regular braid pattern, in which one first strand passes under two second strands then over two second strands. Five first strands 109A, 109B, 109C, 109D and 109E pass from the lower left to the upper right while four second strands 111A, 111B, 111C and 111D pass from the lower right to the upper left. A first strand thus can pass through four different phases which repeat every four strands traveling from side to side, and from strand to strand. First strand 109A and strand 109E are in the same phase with respect to the same second strand; for example, strand 111A. In this embodiment, there is the same number of first and second strands wrapped helically about a center axis.

FIG. 3F illustrates another braid pattern 113, termed a "diamond pattern, full load." In this pattern, five pairs of first strands 115A, 115B, 115C, 115D and 115E pass from the lower left to the upper right. Four pairs of second strands 117A, 117B, 117C and 117D pass from the lower right to the upper left. Each strand in a pair travels side-by-side in the same phase with its paired strand. In this embodiment, each pair of strands is in one of two phases, which repeat with every other pair of strands. First strand pairs 115A and 115B are both in the same phase with respect to second strand pair 117A. In this embodiment, there are the same number of first strands and second strands. In other embodiments, this relative number can vary, for example, with one first strand pair passing over a single second strand then under a single second strand, rather than a strand pair as shown in FIG. 3F.

FIG. 3G illustrates another braid pattern 119, referred to as a diamond braid pattern. This pattern can also be referred to as a "diamond pattern, half." In this pattern, a first strand passes under one second strand then over one second strand. As shown, first strands 121A, 121B, 121C, 121D and 121E pass from the lower left to the upper right while second strands 123A, 123B, 123C and 123D pass from the lower right to the upper left. In this example, the strands are in one of two phases with adjacent strands being out of phase with respect to each other.

In a preferred embodiment, as shown in FIGS. 1, 4, and 5, respective interconnect bodies 12, 18, 46 are positioned between opposed first and second or positive and negative terminals of two adjacently positioned first and second electrochemical cells 16A, 16B. As shown in FIG. 1, the distal portion 20 of the interconnect body 12 is preferably attached to the first contact plate 14A and the proximal portion 22 of the interconnect body 12 is preferably attached to the second contact plate 14B. The first contact plate 14A being electrically contactable to a negative or first terminal of the first electrochemical cell 16A. The second contact plate 14B being electrically contactable to a positive or second terminal of the second electrochemical cell 16B.

Alternatively, the distal portion 20, 48 of respective interconnect bodies 12, 18, 46 may be electrically contactable to the negative or positive (first or second) terminal of the first or second electrochemical cell 16A, 16B and the proximal portion 22, 50 of respective interconnect bodies 12, 18, 46 may be electrically contactable to the positive or negative (first or second) terminal of the first or second electrochemical cell 16A, 16B.

In an embodiment, the proximal portion 22, 50 and/or distal portion 20, 48 of the interconnect body 18, 46 may be encapsulated in an encapsulate material 88, such as an epoxy resin. As shown, in FIG. 1, the proximal portion 22 of the interconnect body 12, which is attached to the second contact plate 14B, is encapsulated therewithin. More specifically, as shown in FIG. 1, the proximal portion 22 of the interconnect body 12 is shown attached to the second contact plate 14B. The second contact plate 14B is also shown attached to a terminal pin 90. The terminal pin 90 is further illustrated to be positioned in a glass-to-metal seal 91 within a ferrule 93. As illustrated, the second electrical cell 16B has a cell case 92 with opposing left and right sidewalls 94, 96 connected to a lid 98 of the cell 16B. These extended sidewalls 94, 96 preferably provide a reservoir 100 in which to hold the encapsulate material 88. In a preferred embodiment, as shown in FIG. 1, the encapsulate material 88 contained in lid 98 may cover the contact plate 14A, 14B and the distal 20, 48 or proximal portion 22, 50 of the interconnect body 18, 46. In a preferred embodiment, the encapsulate material 88 may comprise a thermally conductive resin epoxy such as Stycast® 2850FT manufactured by Emerson & Cuming of Billerica Mass.

FIG. 4 illustrates an embodiment of the distal portion 20 of the interconnect body 18 electrically attached to a negative terminal of the first electrochemical cell 16A. As shown, the distal portion 20 of the interconnect body 18 is electrically connected to the first contact plate 14A which is attached to the negative terminal of the first cell 16A. More preferably, the first contact plate 14A and the distal portion 20, 48 of respective interconnect bodies 18, 46 may be welded to the negative or positive terminal (first or second terminal) of the first cell 16A. Furthermore, the second contact plate 14B and the proximal portion 22, 50 of respective interconnect bodies 18, 46 may also be welded to the negative or positive terminal (first or second terminal) of the second cell 168. As illustrated, weld connections 102 are shown connecting the contact plate 14A to the cell 16A. It is noted that while it is preferred to utilize respective first and second contact plates 14A, 14B, to facilitate an electrical contact between the interconnect body 18, 46 and electrochemical cells 16A, 16B, the interconnect bodies 18, 46 may directly contact the terminals of the cells 16A, 16B without the need of the contact plates 14A, 14B.

FIG. 5 illustrates an embodiment of a modular battery 104 that may be utilized by the interconnect assembly 10 of the present invention. As shown, the modular battery 104 comprises at least one electrochemical cell 16 that resides within a modular battery housing 106. In a preferred embodiment, the modular battery housing may be composed of a polymeric or fiberglass material. More preferably, the modular battery housing 106 may be composed of tetrafluoroethylene, polyaryletherketone, or other polymeric material that can withstand temperatures greater than about 100° C.

As shown in FIG. 5, the exemplar modular battery 104 comprises a total of four electrochemical cells 16. Each of these cells 16 comprises a cell casing 108 that encloses an anode and cathode therewithin. As shown, the interconnect body 18, 46 is positioned between each of the electrochemical cells 16 within the modular battery 104. In addition, interconnect body 46 may also be positioned between each of the electrochemical cells 16 within the modular battery 104. In a preferred embodiment, the electrochemical chemistries of the cells 16 are non-limiting and may comprise a primary or secondary cell chemistry. Examples of such electrochemical cells include but are not limited to Lithium Ion (LiON), Nickel Cadmium (NiCd), Nickel Metal Hydride (NiMH), Lithium Oxyhalide, Thionyl Chloride, Bromine Chloride, and Chlorinated Sulfuric Chloride.

Furthermore, it is noted that the modular battery 104 is not limited and may comprise types of batteries that can be used in medical devices, satellites to perform in extreme heat and pressure, survive pounding shock and vibration forces and often withstand corrosive environments; telematic services, military and aerospace applications such as flight data recorders, field communications devices, munitions, sensing devices, intelligence and surveillance, GPS systems, and un-manned aerial vehicles; seismic surveying; oceanography; and other industrial uses.

While preferred embodiments of the present invention have been disclosed, it will be appreciated that it is not limited thereto, but may be otherwise embodied with the scope of the following claims.

What is claimed is:

1. A modular battery assembly, comprising:
 a) a first electrochemical cell, comprising:
  i) a first casing enclosing a first anode in electrochemical association with a first cathode,
  ii) wherein the first casing has a casing reservoir having a reservoir surrounding edge residing along an imaginary reservoir plane;
 b) a first terminal pin electrically connected to one of the first anode and the first cathode to thereby serve as a first cell first terminal, wherein the first terminal pin is electrically isolated from the first casing and comprises a first terminal pin distal portion extending outside the first casing, but residing in the casing reservoir, spaced inwardly from the imaginary reservoir plane;
 c) an interconnect assembly, comprising:
  i) a flexible interconnect extending from an interconnect proximal portion to an interconnect distal portion;
  ii) a proximal electrically conductive contact plate connected to the interconnect proximal portion in a first connection; and
  iii) a distal electrically conductive contact plate connected to the interconnect distal portion,
 d) wherein the proximal contact plate is physically connected to the first terminal pin distal portion in a second connection, and wherein the first and second connections reside in the casing reservoir, spaced inwardly from the imaginary reservoir plane;
 e) an encapsulate material residing in the casing reservoir and encapsulating the first and second connections of the proximal contact plate to the respective interconnect proximal portion and the first terminal pin distal portion, wherein the encapsulate material does not encapsulate the distal contact plate; and
 f) a second electrochemical cell, comprising:
  i) a second casing enclosing a second anode in electrochemical association with a second cathode;
  ii) a second terminal pin electrically connected to one of the second anode and the second cathode to thereby serve as a second cell first terminal, wherein the second cell first terminal is electrically isolated from the second casing and is of the same polarity as the first terminal pin serving as the first cell first terminal, iii) wherein the second casing is connected to the other of the second anode and the second cathode not electrically connected to the second terminal pin to thereby serve as a second cell second terminal having a polarity that is opposite that of the second terminal pin, and iv) wherein the distal contact plate connected to the interconnect distal portion is directly contacted to the second casing of the second electrochemical cell so that the first and second electrochemical cells are electrically connected in series, and v) wherein the flexibility of the interconnect of the interconnect assembly is configured so that the first and second electrochemical cells to move with respect to each under mechanical shock and vibration conditions.

2. The modular battery assembly of claim 1, wherein the encapsulate material is a resin epoxy.

3. The modular battery assembly of claim 2, wherein the resin epoxy is thermally conductive.

4. The modular battery assembly of claim 1, wherein proximal contact plate comprises spaced apart first and second sides, and wherein the first terminal pin distal portion is connected to the proximal contact plate first side opposite the proximal contact plate second side connected to the interconnect proximal portion.

5. The modular battery assembly of claim 1, wherein the first terminal pin is supported in a glass-to-metal seal, and wherein the glass-to-metal seal is supported in a lid for the first casing of the first electrochemical cell.

6. The modular battery assembly of claim 5, wherein the lid comprises a lid sidewall providing the reservoir.

7. The modular battery assembly of claim 6, wherein the interconnect comprises a plurality of interwoven wire strands.

8. The modular battery assembly of claim 1, wherein the encapsulate material does not encapsulate the interconnect distal portion.

9. The modular battery assembly of claim 1, wherein the distal contact plate comprises opposed third and fourth sides, and wherein the interconnect distal portion is connected to the distal contact plate third side and the distal contact plate fourth side is directly contacted to the second casing serving as the second cell second terminal.

10. The modular battery assembly of claim 1, wherein the interconnect comprises a first wire strand, a second wire strand and a third wire strand, and wherein the second wire strand crosses over in front of the third wire strand at a first crossing point and the third wire strand crosses over in front of the second strand at a second crossing point spaced from the first crossing point, and wherein the first wire strand passes alternatively under and over the first and second crossing points.

11. The modular battery assembly of claim 1, wherein the distal contact plate comprises at least one planar side that is directly contacted to a planar surface of the second casing serving as the second cell second terminal.

12. A modular battery assembly, comprising:

a) a first electrochemical cell, comprising:
i) a first casing enclosing a first anode in electrochemical association with a first cathode; and
ii) wherein the first casing has an upwardly extending sidewall providing a casing reservoir having a reservoir surrounding edge residing along an imaginary reservoir plane;

b) a first terminal pin electrically connected to one of the first anode and the first cathode to thereby serve as a first cell first terminal, wherein the first terminal pin is electrically isolated from the first casing and comprises a first terminal pin distal portion extending outside the first casing, bur residing in the casing reservoir, spaced inwardly from the imaginary reservoir plane;

c) an interconnect assembly, comprising:
i) a flexible interconnect comprising a plurality of interwoven wire strands extending from an interconnect proximal portion to an interconnect distal portion;
ii) a proximal electrically conductive contact plate connected to the interconnect proximal portion in a first connection; and
iii) a distal electrically conductive contact plate connected to the interconnect distal portion; and d) wherein the proximal contact plate is connected to the first terminal pin distal portion in a second connection, and wherein the first and second connections reside in the casing reservoir, spaced inwardly from the imaginary reservoir plane;

e) an encapsulate material residing in the casing reservoir and encapsulating the first and second connections of the proximal contact plate to the respective interconnect proximal portion and the first terminal pin distal portion, wherein the encapsulate material does not encapsulate the distal contact plate; and f) a second electrochemical cell, comprising:
i) a second casing enclosing a second anode in electrochemical association with a second cathode;
ii) a second terminal pin electrically connected to one of the second anode and the second cathode to thereby serve as a second cell first terminal, wherein the second cell first terminal is electrically isolated from the second casing and is of the same polarity as the first terminal pin serving as the first cell first terminal,
iii) wherein the second casing is connected to the other of the second anode and the second cathode not electrically connected to the second terminal pin to thereby serve as a second cell second terminal having a polarity that is opposite that of the second terminal pin, and
iv) wherein the distal contact plate connected to the interconnect distal portion is directly contacted to the second casing of the second electrochemical cell so that the first and second electrochemical cells are electrically connected in series, and
v) wherein the flexibility of the interconnect of the interconnect assembly is configured so that the first and second electrochemical cells move with respect to each under mechanical shock and vibration conditions.

13. The modular battery assembly of claim 12, wherein the distal contact plate comprises at least one planar side that is directly contacted to the second casing serving as the second cell second terminal.

14. The modular battery assembly of claim 12, wherein the encapsulate material is a resin epoxy.

15. The modular battery assembly of claim 14, wherein the resin epoxy is thermally conductive.

16. The modular battery assembly of claim 12, wherein proximal contact plate comprises spaced apart first and second sides, and wherein the first terminal pin distal portion is connected to the proximal contact plate first side opposite the proximal contact plate second side connected to the interconnect proximal portion.

17. The modular battery assembly of claim 12, wherein the first terminal pin is supported in a glass-to-metal seal, and wherein the glass-to-metal seal is supported in a lid for the first casing of the first electrochemical cell.

18. The modular battery assembly of claim 17, wherein the lid comprises a lid sidewall providing the reservoir.

19. A modular battery assembly, comprising:
a) a first electrochemical cell, comprising:
i) a first casing enclosing a first anode in electrochemical association with a first cathode,
ii) wherein the first casing has a casing reservoir having a reservoir surrounding edge residing along an imaginary reservoir plane;
b) a first terminal pin electrically connected to the first cathode to thereby serve as a first cell positive terminal, wherein the first terminal pin is electrically isolated from the first casing and comprises a first terminal pin distal portion extending outside the first casing, but residing in the casing reservoir, spaced inwardly from the imaginary reservoir plane;
c) an interconnect assembly, comprising:
i) a flexible interconnect extending from an interconnect proximal portion to an interconnect distal portion;
ii) a proximal electrically conductive contact plate connected to the interconnect proximal portion in a first connection; and
iii) a distal electrically conductive contact plate connected to the interconnect distal portion,
d) wherein the proximal contact plate is physically connected to the first terminal pin distal portion in a second connection, and wherein the first and second connections reside in the casing reservoir, spaced inwardly from the imaginary reservoir plane;
e) an encapsulate material residing in the casing reservoir and encapsulating the first and second connections of the proximal contact plate to the respective interconnect proximal portion and the first terminal pin distal portion, wherein the encapsulate material does not encapsulate the distal contact plate; and
f) a second electrochemical cell, comprising:
i) a second casing enclosing a second anode in electrochemical association with a second cathode;
ii) a second terminal pin electrically connected to the second cathode to thereby serve as a second cell positive terminal, wherein the second cell positive terminal is electrically isolated from the second casing,
iii) wherein the second casing serves as a second cell negative terminal, and
iv) wherein the distal contact plate comprises at least one planar side that is directly contacted to a planar surface of the second casing of the second electrochemical cell so that the first and second electrochemical cells are electrically connected in series, and
v) wherein the flexibility of the interconnect of the interconnect assembly is configured so that the first and second electrochemical cells to move with respect to each under mechanical shock and vibration conditions.

* * * * *